(12) United States Patent
Lange

(10) Patent No.: US 9,931,606 B2
(45) Date of Patent: Apr. 3, 2018

(54) SINGLE-LEVER MIXING CARTRIDGE

(71) Applicant: Fluehs Drehtechnik GmbH, Luedenscheid (DE)

(72) Inventor: Lutz Lange, Luedenscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 741 days.

(21) Appl. No.: 14/377,596

(22) PCT Filed: Feb. 4, 2013

(86) PCT No.: PCT/EP2013/052155
§ 371 (c)(1),
(2) Date: Aug. 8, 2014

(87) PCT Pub. No.: WO2013/127600
PCT Pub. Date: Sep. 6, 2013

(65) Prior Publication Data
US 2015/0055433 A1 Feb. 26, 2015

(30) Foreign Application Priority Data
Feb. 28, 2012 (EP) .................................. 12157387

(51) Int. Cl.
*B01F 15/02* (2006.01)
*F16K 11/078* (2006.01)
*F16K 27/04* (2006.01)

(52) U.S. Cl.
CPC ........ *B01F 15/026* (2013.01); *F16K 11/0787* (2013.01); *F16K 27/045* (2013.01)

(58) Field of Classification Search
CPC .................................................. F16K 11/0787
See application file for complete search history.

(56) References Cited

U.S. PATENT DOCUMENTS

2011/0297248 A1* 12/2011 Nelson ...................... E03C 1/04
137/343

FOREIGN PATENT DOCUMENTS

| DE | 32 44 120 A1 | 5/1984 | |
|----|----|----|----|
| EP | 0 075 323 A1 | 3/1983 | |
| EP | 0 590 427 A1 | 4/1994 | |
| EP | 0 637 709 A1 | 2/1995 | |
| EP | 0637709 A1 * | 2/1995 | .......... F16K 11/0787 |
| EP | 1 310 711 A2 | 5/2003 | |

OTHER PUBLICATIONS

International Search Report of PCT/EP2013/052155, dated Apr. 8, 2013.

* cited by examiner

*Primary Examiner* — Tony G Soohoo
*Assistant Examiner* — Elizabeth Insler
(74) *Attorney, Agent, or Firm* — Collard & Roe, P.C.

(57) ABSTRACT

A single-lever mixing cartridge includes a head piece, which accommodates a bottom piece having at least one inflow channel and at least one outlet channel, and a disk control having a control disk that can be displaced via an at least pivotably mounted spindle relative to a passage disk which is arranged in a rotationally fixed manner. At least all inlet channels are provided with at least one lip seal for sealing the bottom piece against the passage disk and/or against a fitting receiving the cartridge.

7 Claims, 15 Drawing Sheets a)

b)

c)

SINGLE-LEVER MIXING CARTRIDGE

CROSS REFERENCE TO RELATED APPLICATIONS

Figure 1:
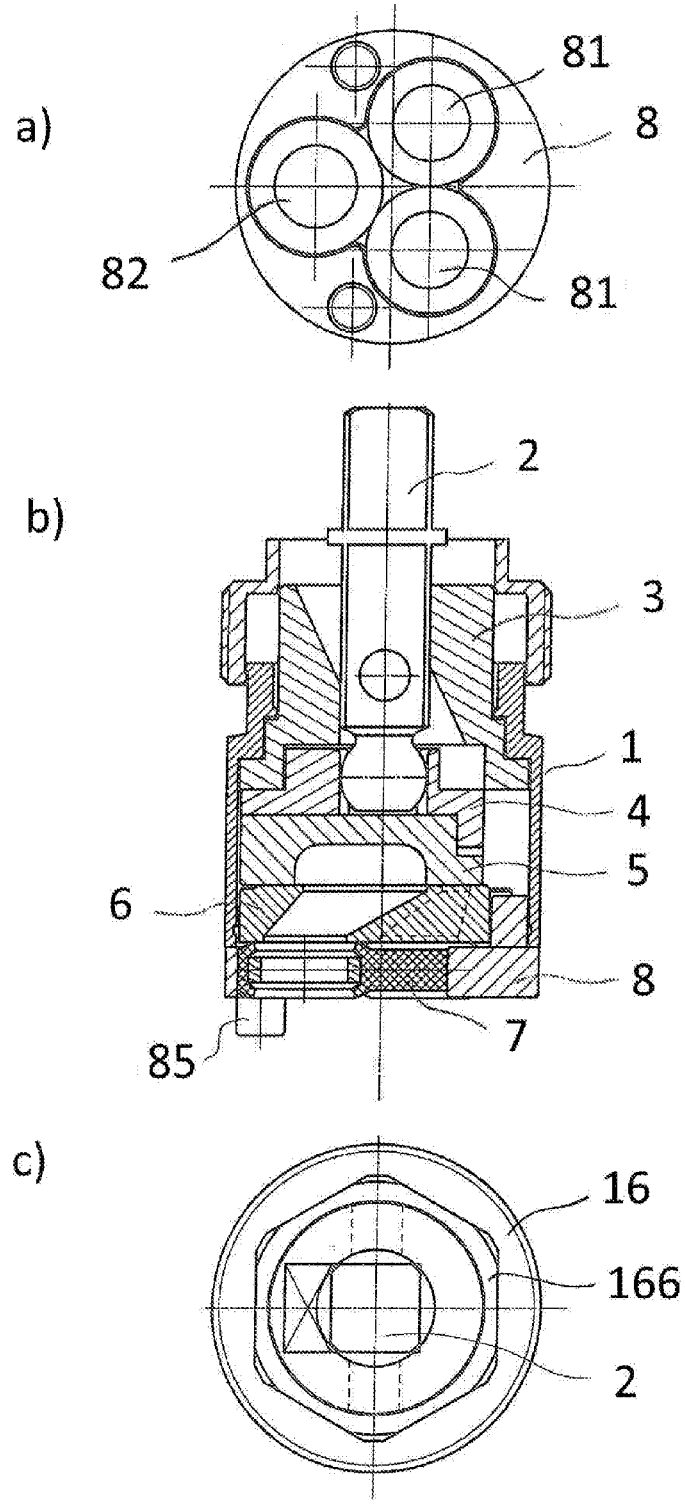

This application is the National Stage of PCT/EP2013/052155 filed on Feb. 4, 2013, which claims priority under 35 U.S.C. § 119 of European Application No. 12157387.7 filed on Feb. 28, 2012, the disclosure of which is incorporated by reference. The international application under PCT article 21(2) was not published in English.

The invention relates to a single-lever mixer cartridge comprising a head piece that accommodates a bottom piece that has at least one inflow channel and at least one outflow channel, as well as a disk controller having a control disk that is disposed so as to be displaced relative to a pass-through disk disposed so as not to rotate, by way of a spindle mounted at least so as to pivot.

Mixer cartridges are frequently used in sanitary fittings, in which a control disk as well as a disk controller having a pass-through disk are disposed, which cartridge can be operated by way of a single lever, in such a manner that not only the amount of water but also the water temperature can be controlled by way of one and the same lever. Such interchangeable cartridges can be used in fitting housings having different structures. In some application areas, modified cartridges are also used, in which a constant mixing ratio is set, whereby the rotational movement of the lever is blocked, so that only an adjustment of the amount of water can take place by way of the pivoting movement of the lever. This embodiment is also used in those application areas in which only one inflow channel is present in the fitting.

In the configuration of fitting housings, there is increasingly a desire for the smallest possible structure. For this reason, it is necessary to construct the mixer cartridges in small and compact manner, whereby simultaneously, the demand for a large amount of water exists. Mixer cartridges are regularly composed of plastic injection-molded parts, whereby because of the small dimensioning of the components, connected with generously dimensioned passage openings to allow water to pass through, only small material thicknesses are present in some regions. At the same time, great demands are made on the seal of the mixer cartridges. For this purpose, projecting flat seals or also O-rings are used. The sealing effect is brought about by way of bracing of the mixer cartridge against the base of a fitting.

Mixer cartridges of the aforementioned type consist of many individual parts, which demonstrate specific production tolerances in each instance. In disadvantageous cases, this can lead to non-uniform contact pressure of the seals used, and this can lead to impairment of the sealing effect.

This is where the invention wants to provide a remedy. The invention is based on the task of creating a single-lever mixer cartridge of the aforementioned type, in which a reliable sealing effect is guaranteed even in the case of disadvantageous additions of production tolerances and non-uniform contact pressure forces resulting from them. According to the invention, this task is accomplished by means of the characteristics described herein.

With the invention, a single-lever mixer cartridge is created, in which a reliable sealing effect is guaranteed even in the case of disadvantageous additions of production tolerances and non-uniform contact pressure forces resulting from them. By means of the use of lip seals, it is made possible for production tolerances to be absorbed, and thereby for contact pressure differences to be equalized, and thereby the sealing effect is guaranteed.

In a further development of the invention, two inflow channels and one outflow channel are disposed in such a manner that their center axes delimit a triangle, preferably an equilateral triangle. A uniform contact pressure distribution is achieved by means of the regular arrangement of the channels and thereby also of the seals that surround them.

In an embodiment of the invention, a flexible molded part is provided, which has at least two passages and on which at least one, preferably two ring-shaped lip seals disposed to lie opposite one another, are formed, in each instance surrounding the at least two passages. Preferably, the flexible molded part has three passages, the center axes of which delimit a triangle, preferably an equilateral triangle. Preferably, the flexible molded part is produced from rubber.

In a further embodiment of the invention, the flexible molded part is formed essentially by three rings, which are molded onto the two other rings, in each instance. In this way, a clover-leaf-like contour is formed, which brings about a space-saving seal arrangement.

In a further development of the invention, a support ring is introduced into the passages of the flexible molded part, in each instance. In this way, a change in shape of the passages or of the rings of the molded seal part, which could lead to impairment of the sealing effect, is prevented.

In a further embodiment of the invention, a recess is introduced into the bottom piece, the inner contour of which essentially corresponds to the outer contour of the flexible molded piece. In this way, a shape-stable position of the molded piece is achieved.

It is advantageous if an edge is formed on the bottom piece, circumferentially, at least in certain sections, which edge accommodates the pass-through disk, in a manner to prevent rotation, lying against the at least one lip seal. In this way, the position of the molded piece is further improved.

In a further embodiment of the invention, the head piece is produced from metal, preferably from brass. In this way, deformation of the head piece resulting from the bias of the mixer cartridge against the fitting is prevented even over a long period of time.

Preferably, the bottom piece is produced from plastic. In this way, cost-advantageous production of the bottom piece, which is complex in terms of its shape, is made possible.

Figure 2:
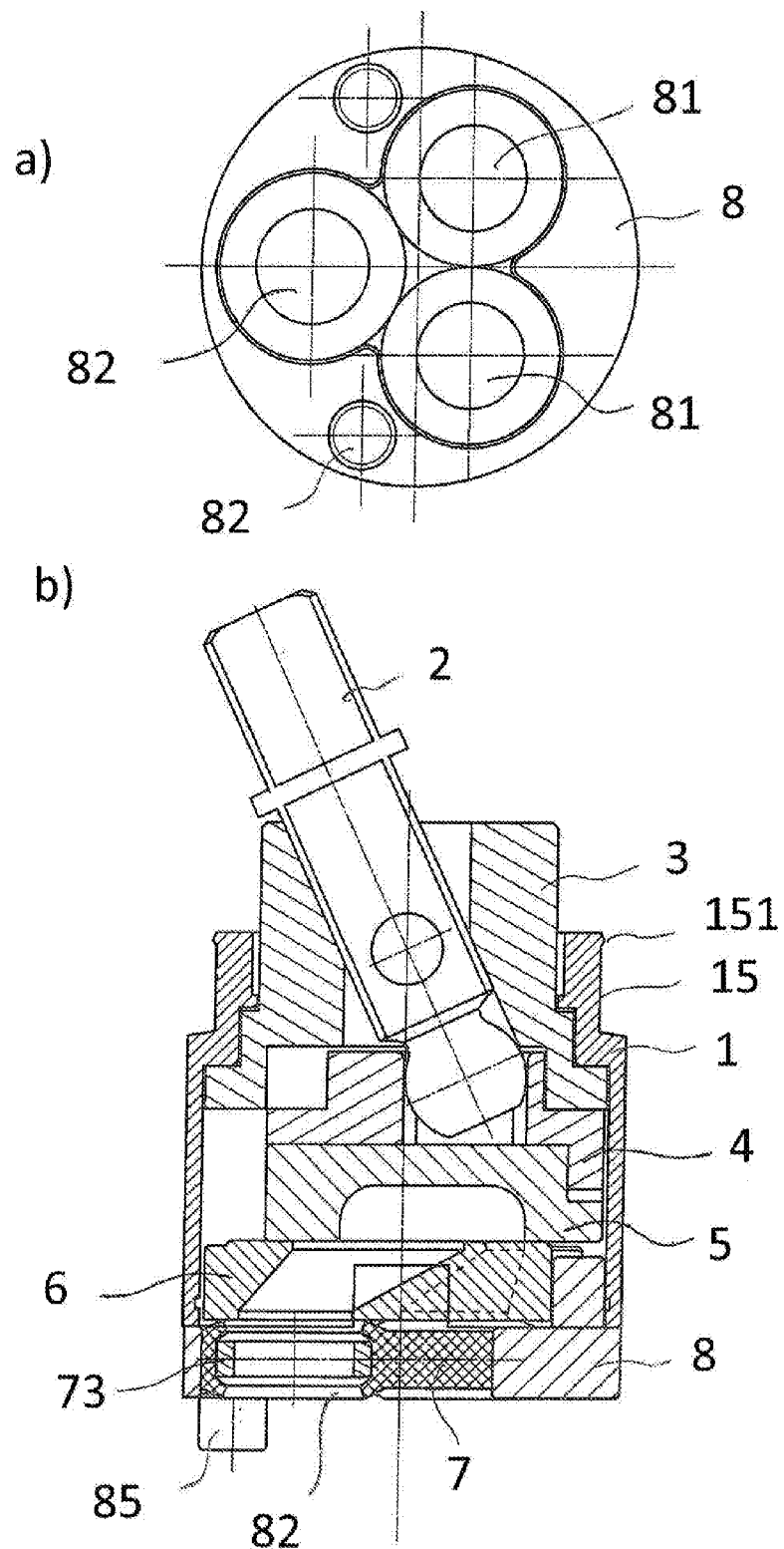
Figure 3:
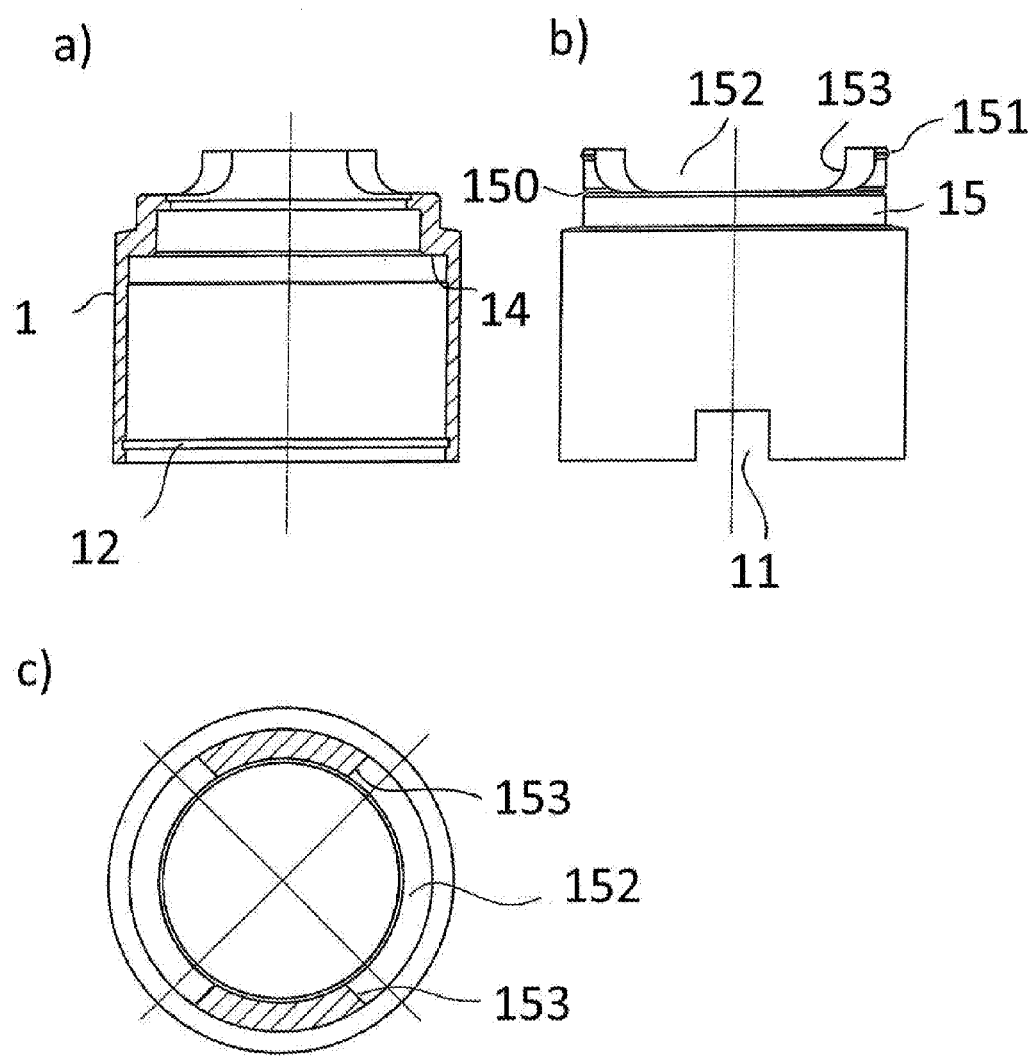
Figure 4:
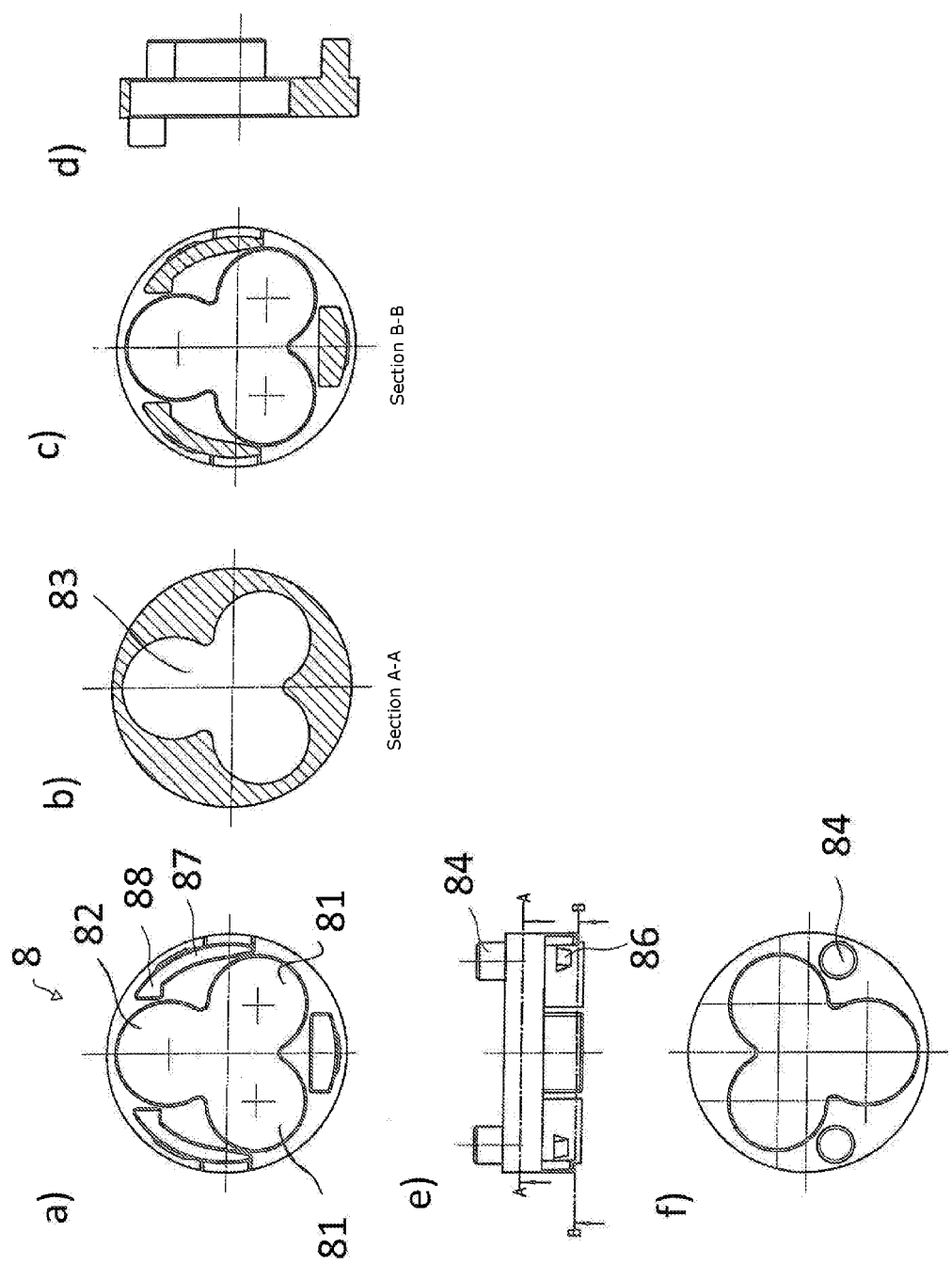
Figure 5:
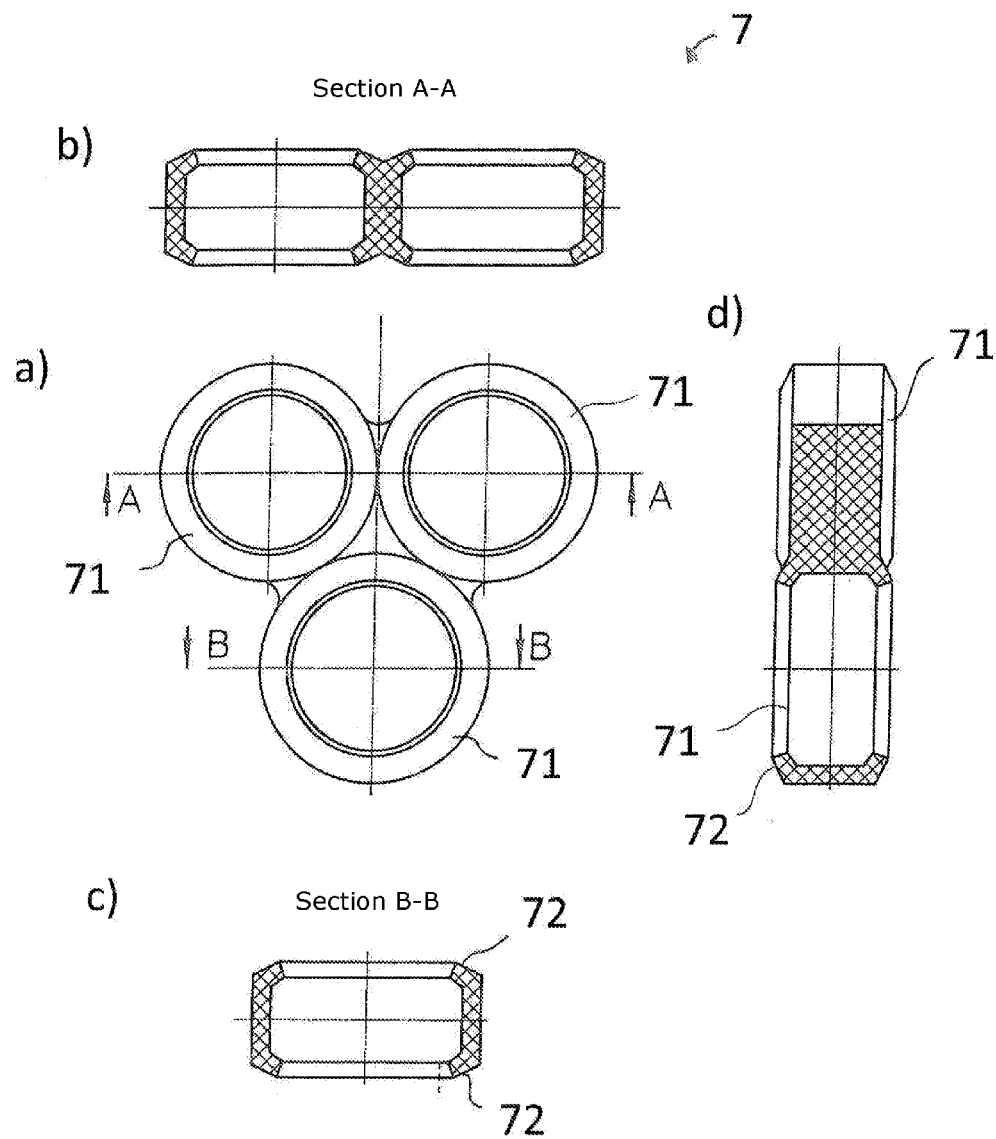
Figure 6:
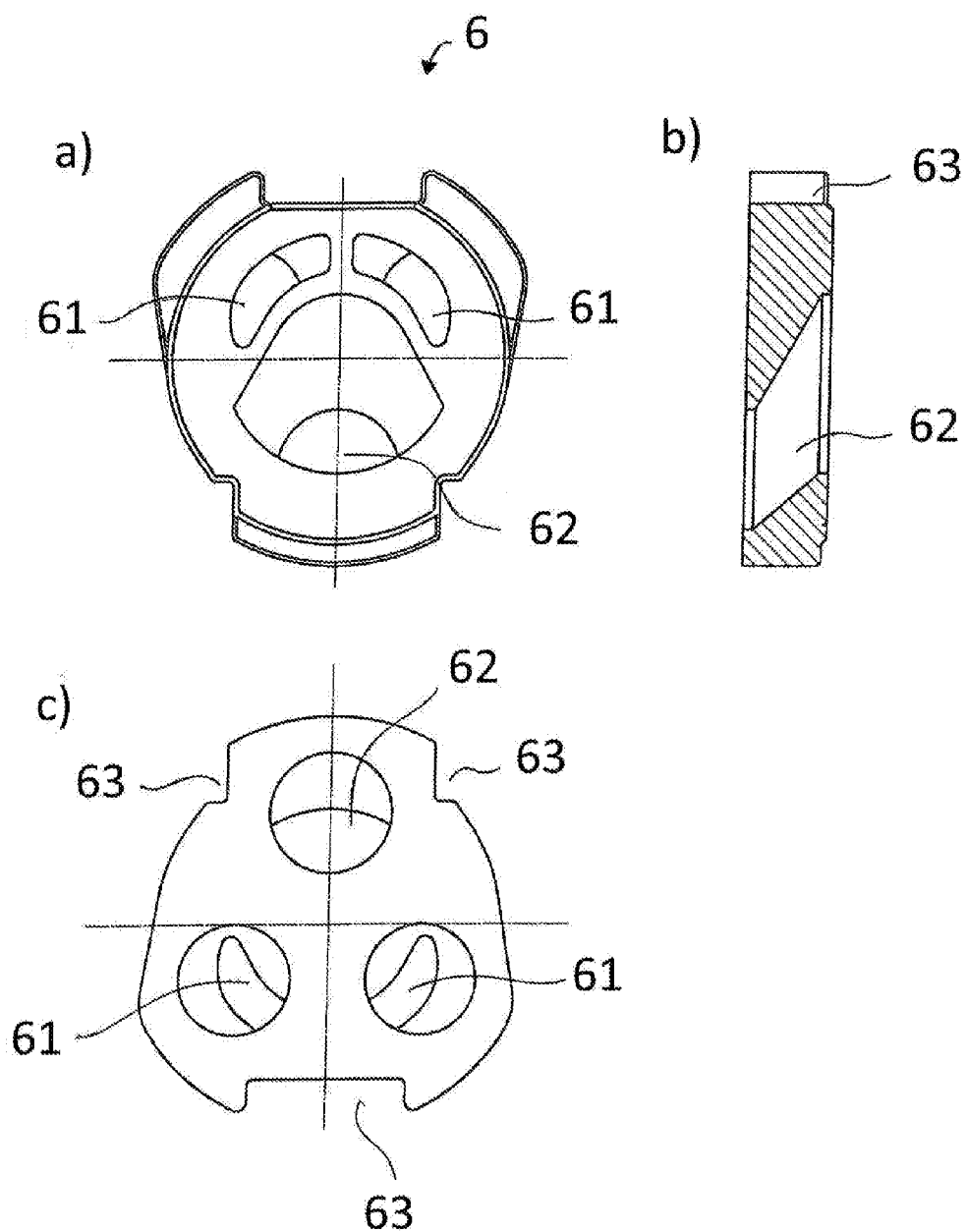
Figure 7:
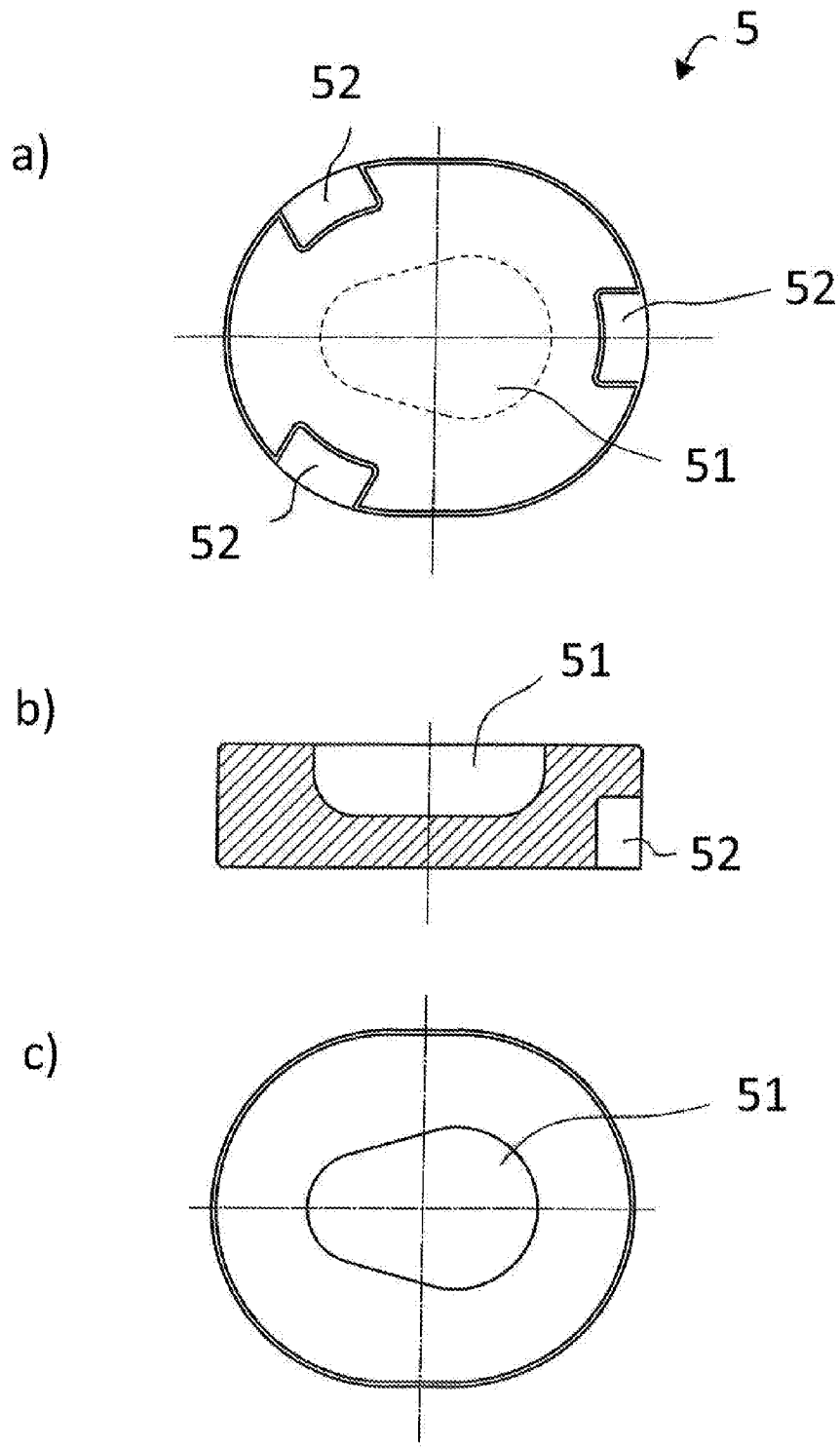
Figure 8:
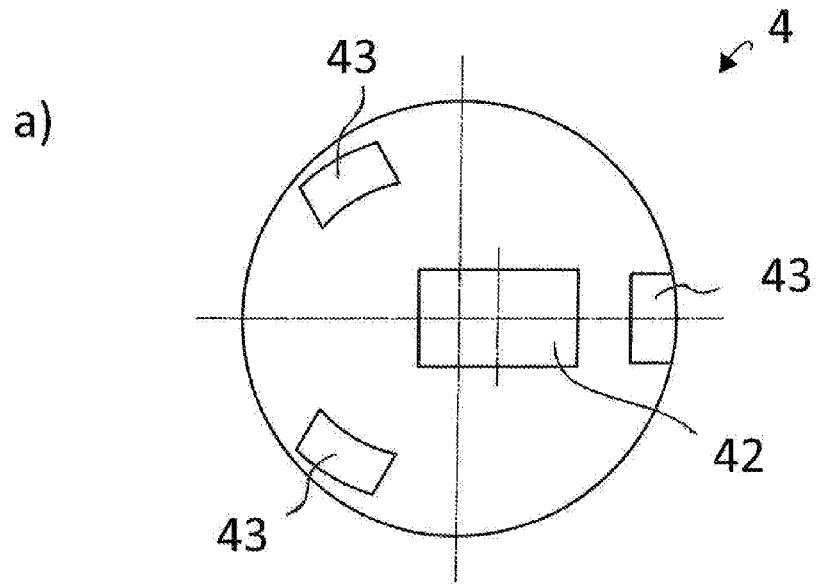
Figure 8:
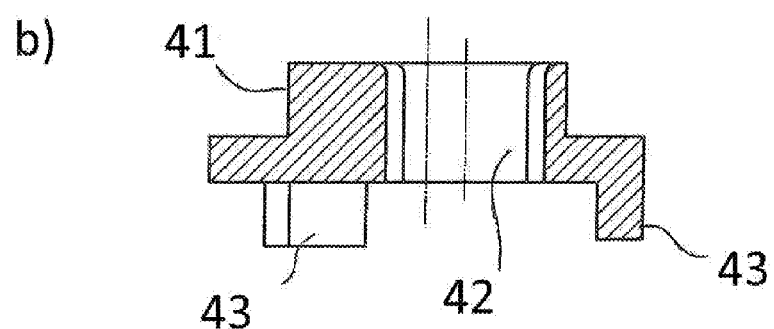
Figure 8:
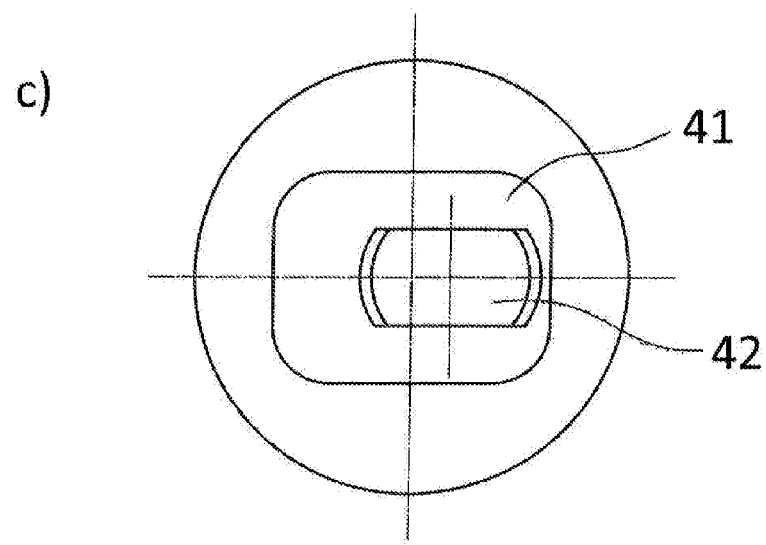
Figure 9:
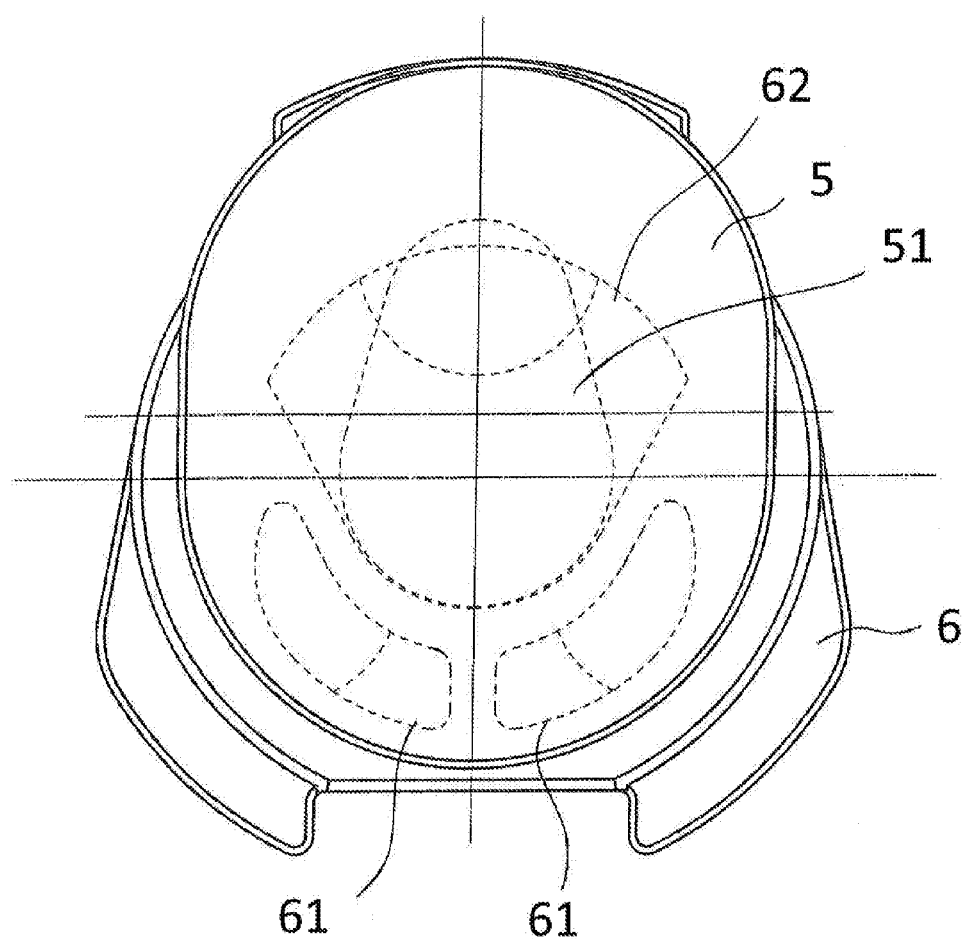
Figure 10:
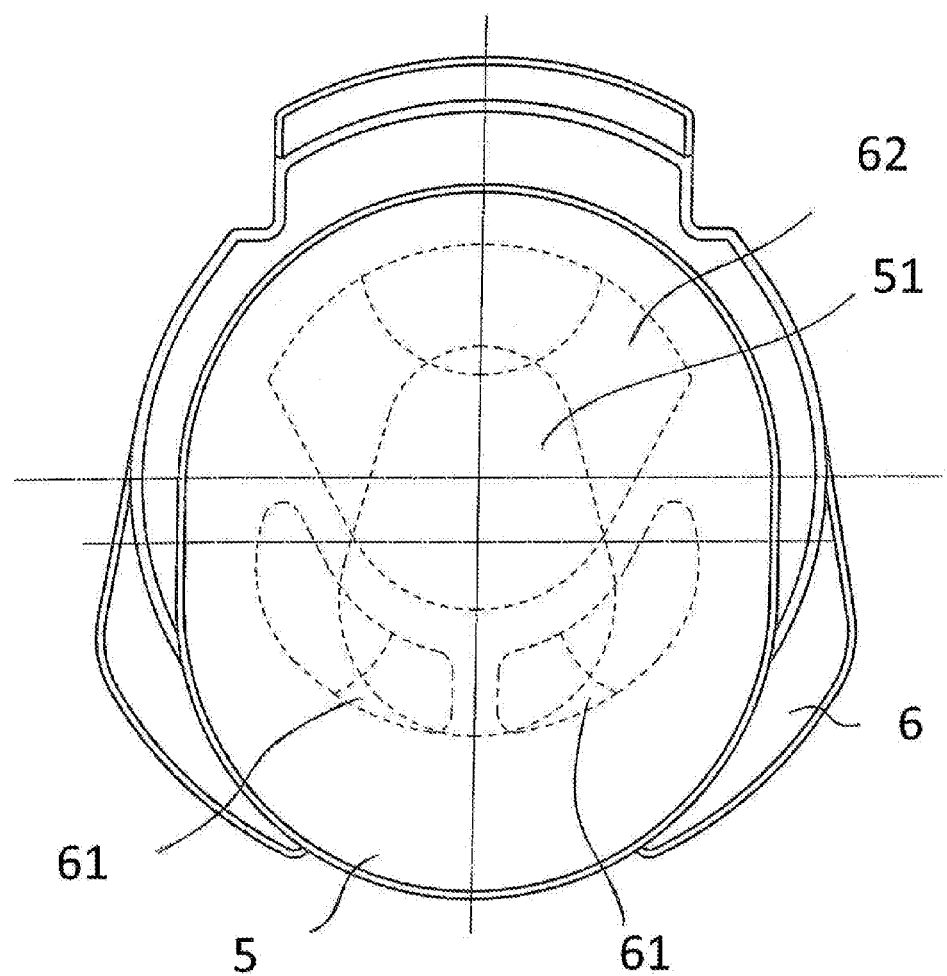
Figure 11:
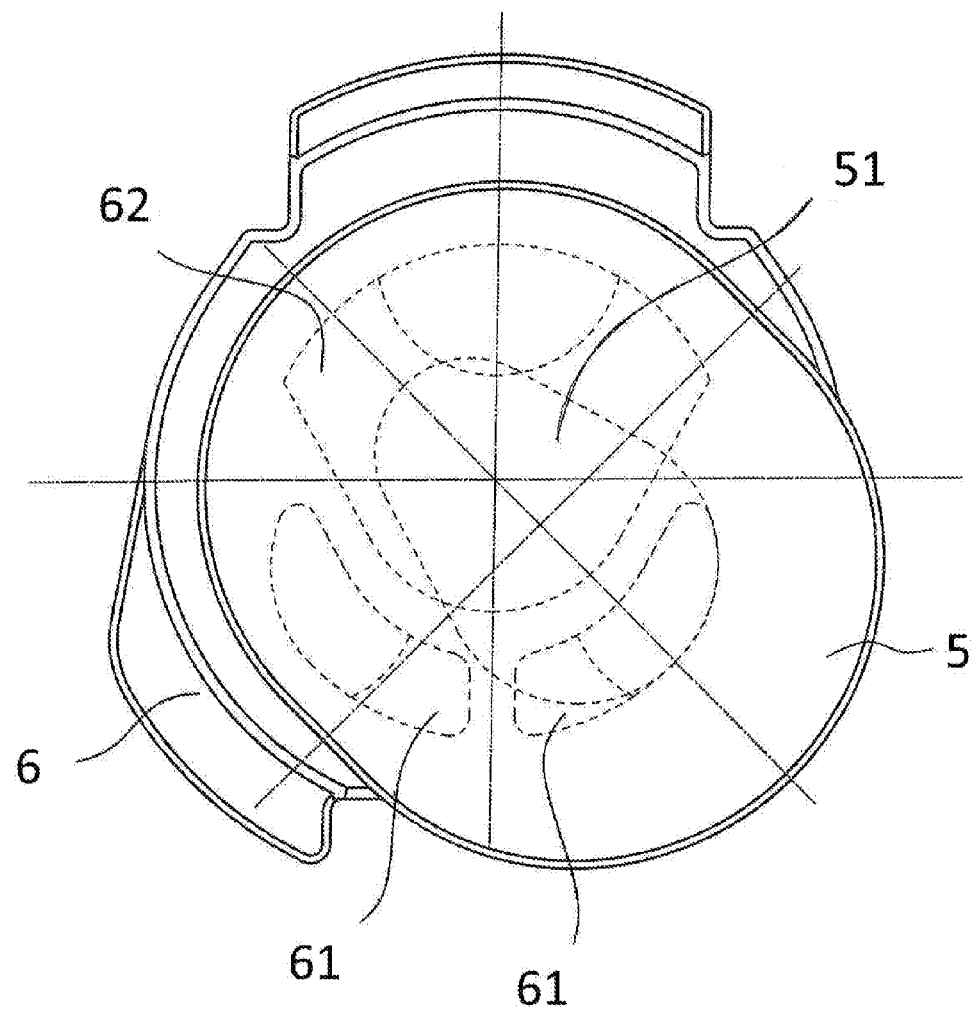
Figure 12:
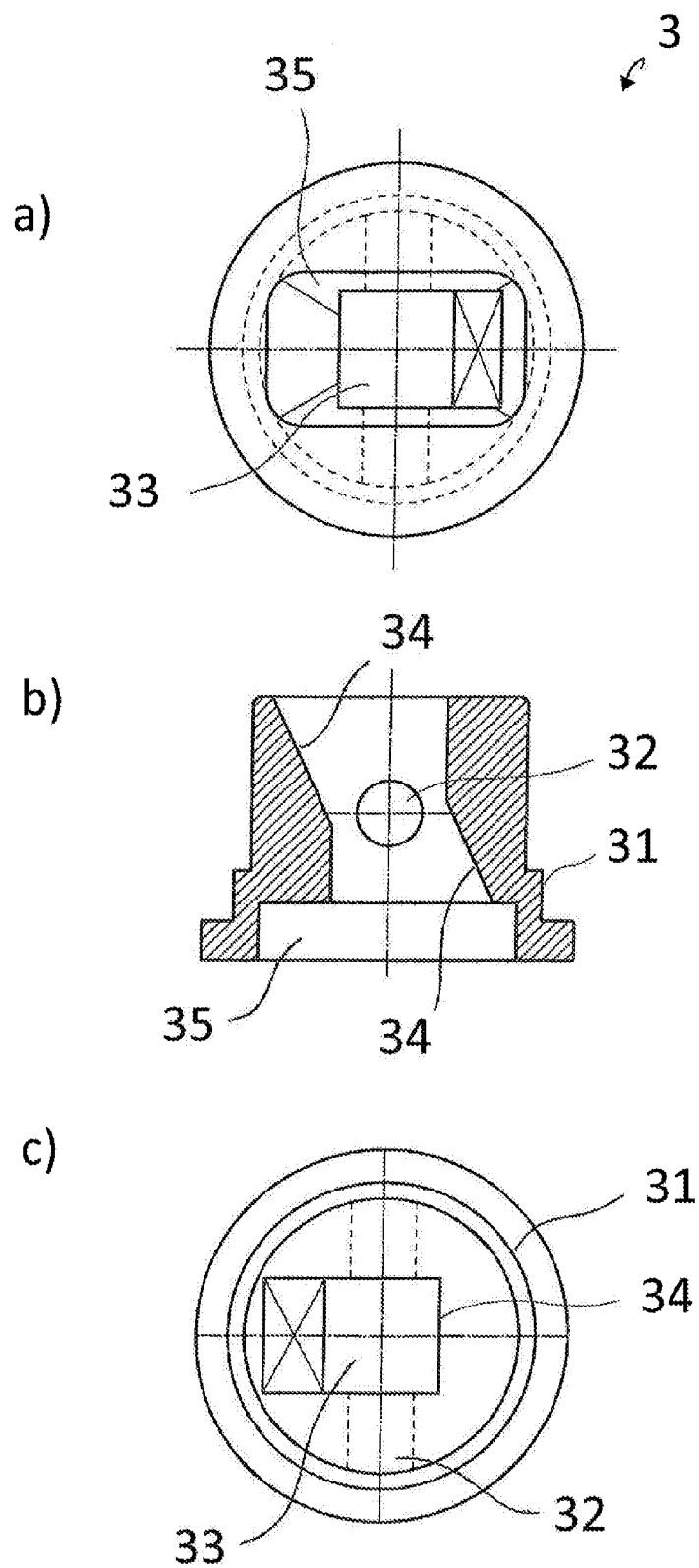
Figure 13:
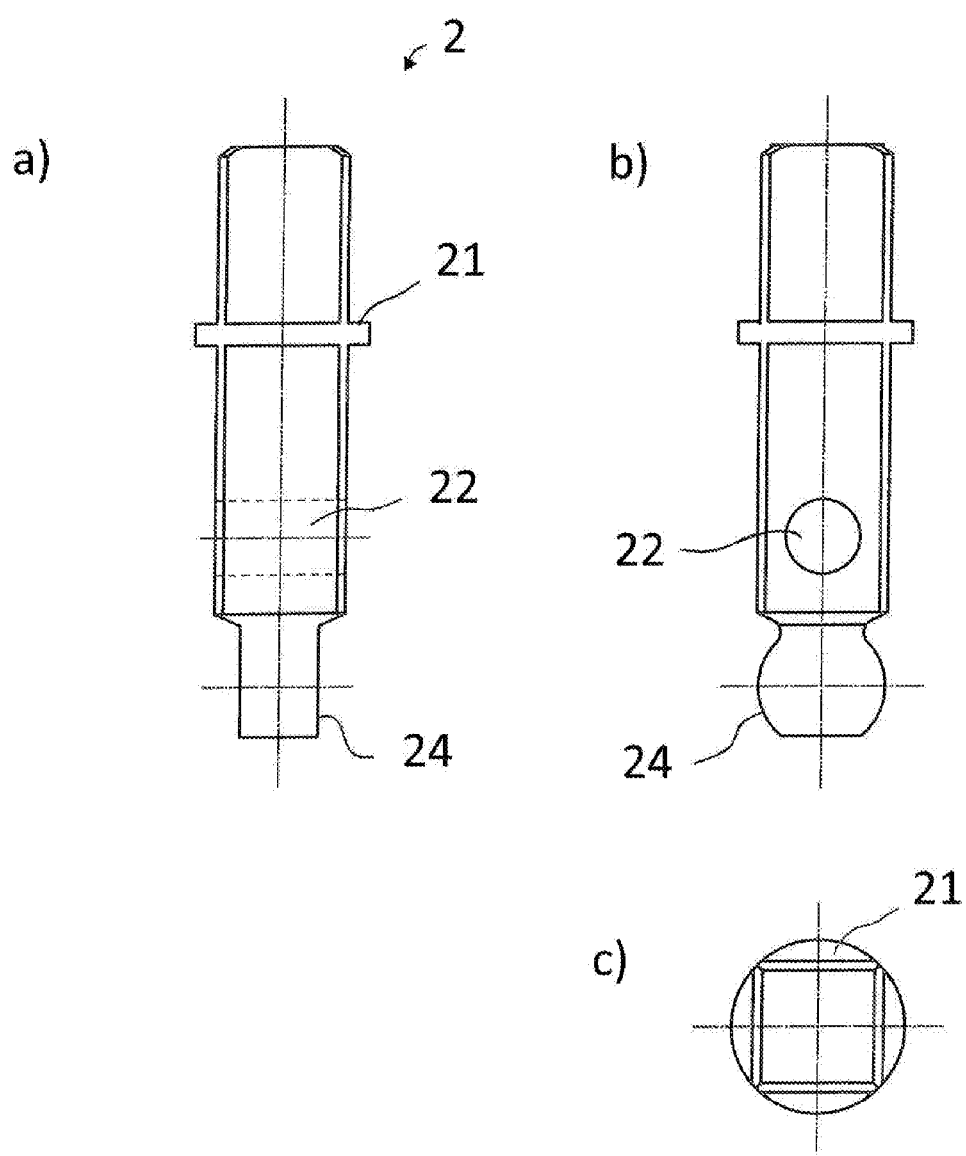
Figure 14:
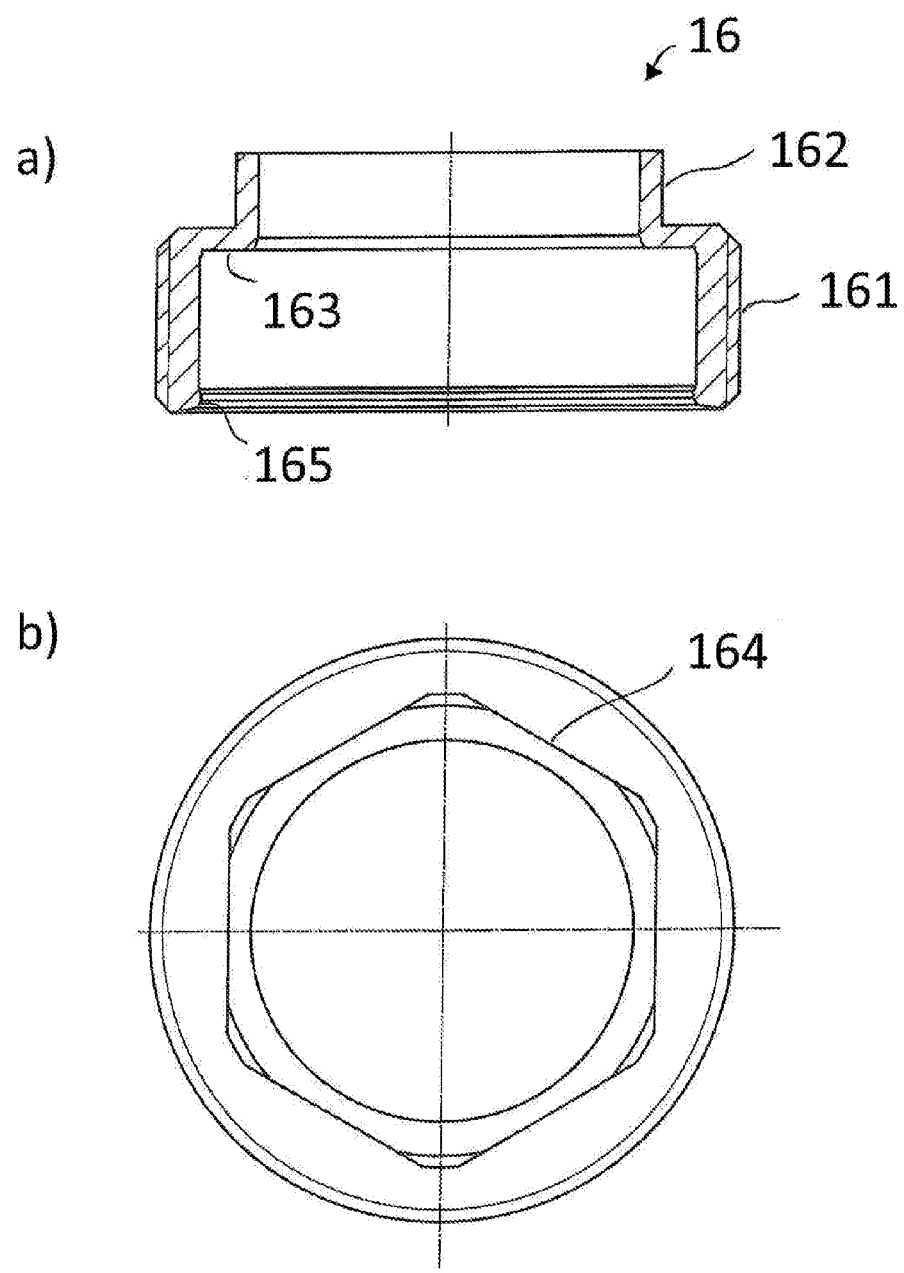
Figure 15:
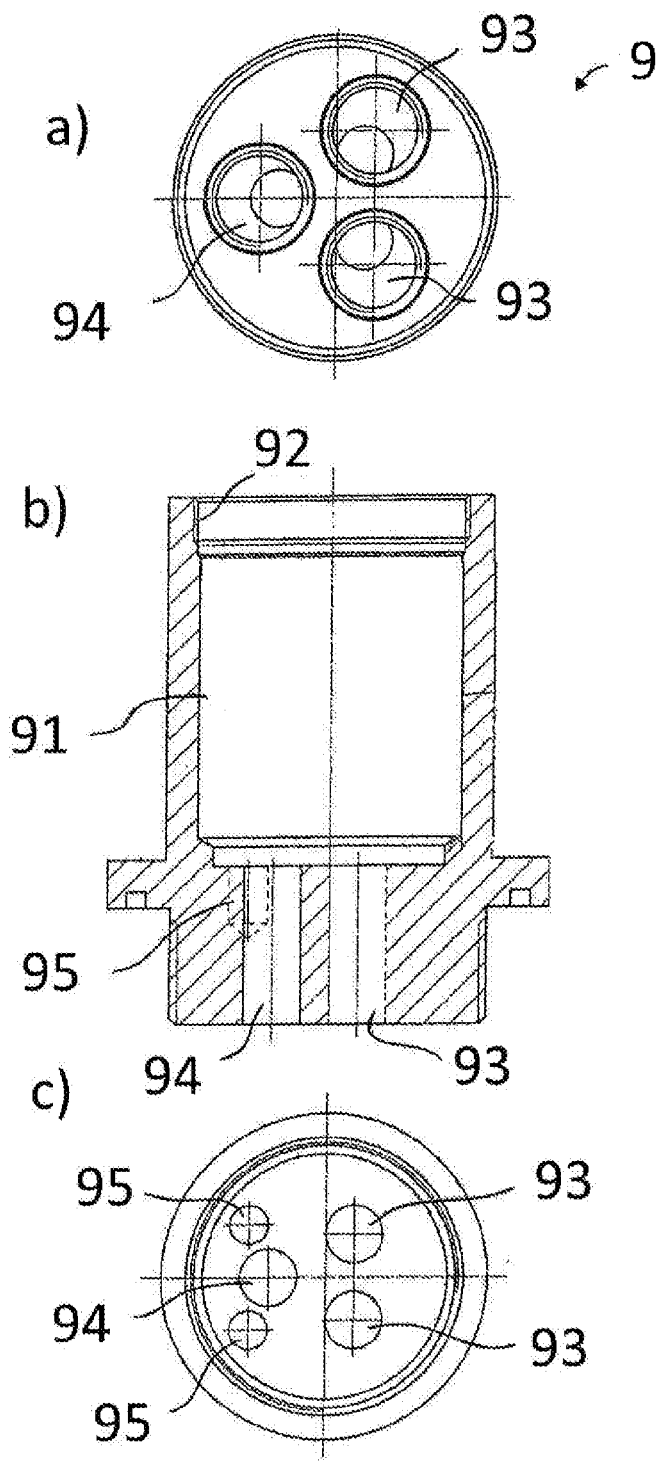

Other further developments and embodiments of the invention are indicated in the remaining dependent claims. An exemplary embodiment of the invention is shown in the drawings and will be described in detail below. The drawings show:

FIG. 1 the schematic representation of a single-lever mixer cartridge (closed position)
 a) in a view from below,
 b) in longitudinal section,
 c) in a top view;
FIG. 2 the single-lever mixer cartridge from FIG. 1 in the open position (without attachment ring)
 a) in a view from below,
 b) in longitudinal section;
FIG. 3 the schematic representation of the head piece of the mixer cartridge from FIG. 1
 a) in longitudinal section,
 b) in a side view (rotated by 90°),
 c) in cross-section;
FIG. 4 the representation of the bottom piece of the mixer cartridge from FIG. 1
 a) in a top view,
 b) in section A-A of the representation from a),
 c) in section B-B of the representation from a),
 d) in longitudinal section, e) in a side view,
f) in a view from below;

FIG. 5 the representation of the molded lip seal part of the mixer cartridge from FIG. 1
a) in a top view,
b) in section A-A of the representation from a),
c) in section B-B of the representation from a),
d) in cross-section;

FIG. 6 the representation of the pass-through disk of the mixer cartridge from FIG. 1
a) in a view from below,
b) in cross-section,
c) in a top view;

FIG. 7 the representation of the control disk of the mixer cartridge from FIG. 1
a) in a view from below,
b) in cross-section,
c) in a top view;

FIG. 8 the representation of the slide piece of the mixer cartridge from FIG. 1
a) in a view from below,
b) in cross-section,
c) in a top view;

FIG. 9 the disk controller of the mixer cartridge from FIG. 1 with control disk and pass-through disk in the "closed" position;

FIG. 10 the disk controller from FIG. 9 in the "mixed water" position;

FIG. 11 the disk controller from FIG. 9 in the "cold water" position;

FIG. 12 the spindle accommodation of the mixer cartridge from FIG. 1
a) in a view from below,
b) in cross-section,
c) in a top view;

FIG. 13 the spindle of the mixer cartridge from FIG. 1
a) in a side view,
b) in a front view,
c) in a top view;

FIG. 14 the fastening ring of the mixer cartridge from FIG. 1
a) in a sectional representation,
b) in a top view, and FIG. 15 a fitting for accommodation of the mixer cartridge from FIG. 1
a) in a view from below,
b) in a sectional representation,
c) in a top view.

The single-lever mixer cartridge selected as an exemplary embodiment essentially consists of a head piece 1, into which a spindle 2 projects axially, which spindle is mounted so as to pivot in a spindle accommodation 3 that is mounted so as to rotate, and engages into a slide piece 4 that is connected with a control disk 5 that corresponds with a pass-through disk 6, which is sealed against a bottom piece 8 by way of a molded seal part 7.

The head piece 1 is configured in the manner of a sleeve and is produced as a lathed brass part in the exemplary embodiment. Two rectangular recesses 11 that lie diametrically opposite one another are formed on the head piece 1 at its end facing the bottom piece 8, which recesses extend beyond an engagement groove 12 introduced on the inside of the head piece 1, on the end side. At its end that lies opposite the recesses 11, the head piece 1 has a diameter-reduced section 15, into which a groove 150 that runs circumferentially approximately in the center is introduced, and which section is provided with a circumferential projection 151 on its end side. In the diameter-reduced section 15, two recesses 152 are introduced diametrically opposite one another, which extend all the way to the circumferential groove 150 and by means of which recesses two radial stops 153 are formed, in each instance. The stops 153 serve to limit the rotation of the spindle accommodation 3. On the inside, a step 14 is formed by means of the diameter-reduced section. For embodiments in which the mixing ratio is supposed to be set in constant manner, the recesses can be configured as a bore into which the axial pin 23 of the spindle 2 engages, thereby blocking rotation of the spindle accommodation 3.

Furthermore, a fastening ring 16 is set over the diameter-reduced section 15 of the head piece 1. The fastening ring 16 has an outside thread 161 on the outside circumference, so as to be screwed into a fitting 9. Above the outside thread 161, a diameter-reduced section 162 is formed, by means of which section a stop 163 is formed. On the outside, the diameter-reduced section 162 is provided with an outside hexagon 164. At its end opposite the diameter-reduced section 162, a projection 165 is furthermore formed circumferentially on the inside of the fastening ring 16.

In the exemplary embodiment, the spindle 2 is configured essentially in block shape. Approximately in the center of the spindle 2, a circular, coaxial, formed-on part 21 for accommodating an operating part—not shown—is formed. Below the formed-on part 21, a bore 22 for accommodating an axial pin 23 is introduced through the spindle 2. At the end, a control head 24 configured in the manner of a spherical disk is formed onto the spindle 2, which head is configured to be flattened on its side facing the slide piece 4.

The spindle accommodation 3 is configured as an essentially cylindrical plastic injection-molded part. On its end facing the slide piece 4, a two-level step 31 is formed on the spindle accommodation 3, the contour of which step corresponds to the inside contour of the two-level step 14 of the head piece 1, against which it lies. Above the two-level step 31, a radial passage bore 32 for accommodating the axial pin 23 for the spindle 2 is introduced through the spindle accommodation 3. A passage 33 for the spindle 2 is formed axially through the spindle accommodation 3, which passage has lateral stops 34 by means of which the pivot radius of the spindle 2 about the axial pin 23 is limited. The passage 33 opens into an essentially block-shaped accommodation 35 for the slide piece 4.

The slide piece 4, which is structured as a plastic injection-molded part, is configured essentially in the form of a circular disk on which an essentially block-shaped molded piece 41 is formed. The molded piece 41 is configured in such a manner that it can be displaced within the accommodation 35 of the spindle accommodation 3, in the longitudinal direction, and is guided in the transverse direction. An oblong hole 42 for accommodating the control head 24 of the spindle 2 is introduced axially through the slide piece 4, penetrating the molded piece 41. On its undersides, which are directed opposite the molded piece 41, three axial ridges 43 for accommodating the control disk 5 are furthermore formed on the slide part 4, circumferentially on the outside.

The control disk 5 is configured in oval shape and produced as a ceramic part. On its side facing the pass-through disk 6, the control disk has an egg-shaped indentation 51 disposed centrally. On its top, opposite the indentation 51, three recesses 52 for accommodating the ridges 23 of the slide piece 4 are furthermore introduced in the control disk 5, circumferentially on the outside. The control disk 5 is connected with the slide piece 4 with shape fit, by way of the recesses 52.

The pass-through disk 6 is also structured as a ceramic part. Two inlet channels 61 for cold and hot water, respectively, as well as an outlet channel 62, configured to be enlarged relative to the former, for the mixed water are introduced through the pass-through disk 6. The inlet channels 61 as well as the outlet channel 62 are passed through the pass-through disk 6 at a slant relative to the latter. At the sides, three recesses 63 for a shape-fit connection with the bottom piece 8 are introduced on the pass-through disk 6, offset relative to one another.

The molded seal part 7 is produced from rubber in the exemplary embodiment. The molded seal part 7 is formed essentially by three rings 71 that are formed onto the two other rings 71, in each instance, so that a clover-leaf-like contour is formed. Sealing lips 72 are formed on the rings 71 of the molded seal part 7, on the top and on the bottom, in each instance. For shape stabilization, the rings 71 are provided with a support ring 73, in each instance, which is disposed between the sealing lips 72 of the rings 71.

The bottom piece 8 is configured essentially cylindrically. Two inlet bores 81 as well as an outlet bore 82 are introduced into the bottom piece 8, the center axes of which bores delimit an equilateral triangle, in such a manner that the bores make a transition into one another, so that a clover-leaf-like accommodation 83 for the molded seal part 7 is formed. Depending on the cross-section of the bores 81, 82, an arrangement can also occur in which the center axes form a non-equilateral triangle. On its underside, facing away from the head piece 1, two positioning pins 84 are formed in the head piece, for engagement into positioning bores 95 of a fitting 9 that correspond with them. On the sides, two rectangular projections 85 for engagement into the recesses 11 of the head piece 1 are formed on the bottom piece 8, diametrically opposite one another. To the sides of the projections 85, engagement projections 86 for engagement into the engagement groove 12 of the head piece 1 are furthermore formed. These engagement projections 86 allow an engagement connection between the bottom piece 8 and the head piece 1.

Circumferentially around the clover-leaf-like accommodation 83, three ridges 87 for accommodating the pass-through disk 6 in torque-proof manner are formed, at a uniform distance from one another. The ridges 87 engage into the recesses 63 of the pass-through disk 6. To improve the shape fit, projections 88 are formed onto two ridges 87, which projections engage into corresponding recesses 63 of the pass-through disk 6.

A fitting 9 for accommodation of the cartridge described above is shown as an example in FIG. 15. The fitting is configured essentially cylindrically and has a cartridge accommodation 91, at the open end of which an inside thread 92 is introduced, for screwing in the fastening ring 16 of the head piece 1. At the bottom, two water inlet connectors 93 as well as one water outlet connector 94 open into the cartridge accommodation 91; their center axes delimit an equilateral triangle. On both sides of the water outflow connector 94, a positioning bore 95 for accommodating the positioning pins 852 of the bottom piece 8 is introduced, in each instance.

In FIGS. 9 to 11, different positions of the disk controller formed by the control disk 5 and the pass-through disk 6 are shown schematically. In the position according to FIG. 9, none of the inlet channels 61 of the pass-through disk 6 are covered by the indentation 51 of the control disk 5. The inlet channels 61 are therefore closed by the control disk 5. No water through-flow takes place (closed position).

In the position of the disk controller according to FIG. 10, both inlet channels 61 for hot and cold water are covered by the indentation 51 of the control disk 5, which simultaneously also covers the outlet channel 62 of the pass-through disk 6. Mixing of hot and cold water takes place within the indentation 51 of the control disk 5, before the mixed water exits through the outlet channel 62 of the pass-through disk 6. In the position of the disk controller according to FIG. 11, only one inlet channel 61—here the cold water feed—is covered by the indentation 51 of the control disk 5, which connects this inlet channel 61 with the outlet channel 62 of the pass-through disk 6. Therefore only cold water exits from the outlet channel 82 of the bottom piece 8.

In FIG. 2, the arrangement with the disk controller according to FIG. 10 is shown. The mixed water exits from the outlet channel 82 of the bottom piece 8, and gets to the water outlet connector 94 of the fitting 9 in the installed state, in which the positioning pins 84 of the bottom piece 8 engage into the positioning bores 95 of the fitting 9, thereby making extraction of water at the bottom possible.

Control of the water flow exiting from the outlet bore 82 of the bottom piece 8 takes place by way of the spindle 2. Pivoting of the spindle 2 about the axial pin 23 is transferred to the slide piece 4 as well as to the control disk 5 connected with the slide piece 4 with shape fit, by way of the control head 24, thereby bringing about control of the amount of water. Rotation of the spindle 2 is transferred, by way of the axial pin 23, to the spindle accommodation 3 mounted in the head piece 1 so as to rotate, which accommodation is connected with the slide piece 4, with shape fit, by way of the molded piece 41. In this way, the rotational movement is transferred to the slide piece 4 and thereby to the control disk 5 connected with the latter with shape fit, and brings about adjustment of the mixing ratio of the water streams applied to the inlet channels 61 of the pass-through disk 6.

The mixer cartridge is connected with the fitting 9 by way of the fastening ring 16, and biased against the bottom of the cartridge accommodation 91. Bias forces achieved in this way bring about equalization of production tolerances of the individual components, particularly at slide piece 4, control disk 5, pass-through disk 6, and bottom piece 8. As a result of this, a non-uniform contact pressure on the molded seal part 7 can occur between the pass-through disk 6, on the one side, and the bottom piece 8, on the other side. Because of the elastic configuration of the molded seal part 7 with the sealing lips 72 formed on this part, position adaptation of the molded seal part 7 within the accommodation 88 of the bottom piece 8 is made possible, thereby guaranteeing a reliable sealing effect. In effect, a sealing effect of the molded seal part 7 with the sealing lips 72 formed on it, between the inlet and outlet channels 61, 62 of the pass-through disk 6 and the water inflow and outflow connectors 93, 94 of the fitting is brought about by the continuity of the clover-leaf-like accommodation 88 of the bottom piece 8. The sealing effect is supported by the sealing lips 72 that are back-flushed with water. A change in shape of the rings 71 of the molded seal part 7, which could lead to impairment of the sealing effect, is prevented by the support rings 73 introduced into the rings 71. By means of forming the head piece 1 from brass, changes in shape of the head piece 1 are prevented by means of the bias, particularly in the region of the bottom piece 8.

The fastening ring 16 is set onto the diameter-reduced section 15 of the head piece 1, whereby the circumferential projection 151 is forced elastically inward when it passes over the circumferential projection 165 of the fastening ring 16. After having passed the projection 165 of the fastening ring 16, the projection 151 of the diameter-reduced section 15 of the head piece 1 assumes its original position once again. The fastening ring 16 is thereby captively held on the head piece 1. Screwing in of the fastening ring 16 takes place by way of the outside hexagon 164.

The invention claimed is:

1. Single-lever mixer cartridge comprising a head piece that accommodates a bottom piece that has two inflow channels and one outflow channel, as well as a disk controller having a control disk that is disposed so as to be displaced relative to a pass-through disk disposed so as not to rotate, by way of a spindle mounted at least so as to pivot,
    wherein the bottom piece comprises a recess having an inner contour,
    wherein a flexible molded part has an outer contour and is introduced into the recess so that the outer contour of the flexible molded part essentially corresponds to the inner contour of the recess,
    wherein the flexible molded part is produced from rubber,
    wherein the flexible molded part has three passages and three ring-shaped lip seals, each of the three ring-shaped lip seals surrounding a respective passage of the three passages,
    wherein each of the three ring-shaped lip seals has a respective center axis,
    wherein the three respective center axes of the three ring-shaped lip seals together delimit an equilateral triangle,
    wherein the flexible molded part is essentially formed by three rings, each of the three rings being molded onto the two remaining rings so that individual rings directly contact each other, and
    wherein the flexible molded part is disposed in the recess of the bottom part such that at least all the inflow channels of the bottom part are provided with at least one of the three ring-shaped lip seals for sealing the bottom piece off relative to the pass-through disk and/or relative to a fitting that accommodates the cartridge.

2. Single-lever mixer cartridge according to claim 1, wherein the control disk can be rotated and displaced, relative to the pass-through disk disposed in torque-proof manner, by way of the spindle, and
    wherein the spindle is mounted so as to rotate and pivot.

3. Single-lever mixer cartridge according to claim 2, wherein the two inflow channels and the one outflow channel of the bottom piece are disposed in such a manner that their center axes delimit a triangle.

4. Single-lever mixer cartridge according to claim 1, wherein a support ring is introduced into each of the three passages of the flexible molded part.

5. Single-lever mixer cartridge according to claim 1, wherein at least two ridges are formed on circumferentially around the bottom piece, which ridges accommodate the pass-through disk in torque-proof manner, lying against at least one of the three ring-shaped lip seals.

6. Single-lever mixer cartridge according to claim 5, wherein a projection for fixation of the pass-through disk is formed on at least one of the at least two ridges.

7. Single-lever mixer cartridge according to claim 1, wherein the head piece is produced from metal.

\* \* \* \* \*